(12) United States Patent
Baik et al.

(10) Patent No.: US 11,178,716 B2
(45) Date of Patent: Nov. 16, 2021

(54) METHOD AND APPARATUS FOR ESTABLISHING CONNECTION BETWEEN DEVICES BY USING BLUETOOTH LOW ENERGY TECHNOLOGY

(71) Applicant: LG ELECTRONICS INC., Seoul (KR)

(72) Inventors: Jonghyun Baik, Seoul (KR); Jingu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 16/637,726

(22) PCT Filed: Aug. 7, 2018

(86) PCT No.: PCT/KR2018/008975
§ 371 (c)(1),
(2) Date: Feb. 7, 2020

(87) PCT Pub. No.: WO2019/031822
PCT Pub. Date: Feb. 14, 2019

(65) Prior Publication Data
US 2020/0178339 A1    Jun. 4, 2020

Related U.S. Application Data

(60) Provisional application No. 62/542,220, filed on Aug. 7, 2017.

(51) Int. Cl.
*H04W 4/00* (2018.01)
*H04W 76/19* (2018.01)
(Continued)

(52) U.S. Cl.
CPC ............ *H04W 76/19* (2018.02); *H04W 4/80* (2018.02); *H04W 28/18* (2013.01); *H04W 40/244* (2013.01); *H04W 76/14* (2018.02)

(58) Field of Classification Search
CPC ....... H04W 76/19; H04W 4/80; H04W 28/18; H04W 40/244; H04W 76/14; H04W 84/20; H04W 76/27; H04W 40/24
(Continued)

(56) References Cited

U.S. PATENT DOCUMENTS 9,888,504 B2 * 2/2018 Lee ............. H04W 72/02
10,045,181 B2 * 8/2018 Lee ............. H04W 76/25
(Continued)

FOREIGN PATENT DOCUMENTS

KR    20140034154    3/2014
KR    20160065886    6/2016
(Continued)

OTHER PUBLICATIONS

PCT International Application No. PCT/KR2018/008975, International Search Report dated Nov. 28, 2018, 3 pages.

*Primary Examiner* — Marceau Milord
(74) *Attorney, Agent, or Firm* — Lee, Hong, Degerman, Kang & Waimey

(57) ABSTRACT

The present disclosure relates to a method and an apparatus for establishing a reconnection between devices by using Bluetooth low energy (LE). In particular, a method performed by a first device comprises the steps of: performing a reconnection parameter negotiation procedure with a second device; transmitting, via a channel determined on the basis of a result of the negotiation procedure, to the second device, a trigger sequence including at least one trigger codeword for requesting the reconnection; and receiving a beacon from the second device in response to the trigger sequence, wherein when the beacon is received, the reconnection between the first device and the second device may be established.

8 Claims, 14 Drawing Sheets

(51) Int. Cl.
*H04W 76/14* (2018.01)
*H04W 4/80* (2018.01)
*H04W 28/18* (2009.01)
*H04W 40/24* (2009.01)

(58) Field of Classification Search
USPC .................. 370/329, 338, 336, 254, 312
See application file for complete search history.

(56) References Cited

U.S. PATENT DOCUMENTS

| | | | | |
|---|---|---|---|---|
| 10,375,710 | B2* | 8/2019 | Choi | H04W 76/14 |
| 10,390,381 | B2* | 8/2019 | Sivakumar | H04W 24/10 |
| 10,524,298 | B2* | 12/2019 | Choi | H04W 76/10 |
| 10,560,974 | B2* | 2/2020 | Song | H04W 76/10 |
| 10,721,611 | B2* | 7/2020 | Kwon | H04W 4/80 |
| 10,798,548 | B2* | 10/2020 | Choi | H04W 36/12 |
| 10,820,375 | B2* | 10/2020 | Park | H04W 36/03 |
| 10,869,183 | B2* | 12/2020 | Baik | H04W 8/005 |
| 2011/0021142 | A1* | 1/2011 | Desai | H04W 8/005 |
| | | | | 455/41.2 |
| 2012/0265913 | A1* | 10/2012 | Suumaki | H04W 4/80 |
| | | | | 710/303 |
| 2013/0003630 | A1* | 1/2013 | Xhafa | H04W 52/0229 |
| | | | | 370/311 |
| 2013/0040573 | A1* | 2/2013 | Hillyard | H04W 8/005 |
| | | | | 455/41.2 |
| 2013/0040574 | A1* | 2/2013 | Hillyard | H04W 8/005 |
| | | | | 455/41.2 |
| 2013/0090061 | A1* | 4/2013 | Linde | H04W 52/0229 |
| | | | | 455/41.2 |
| 2014/0206346 | A1* | 7/2014 | Kiukkonen | H04W 52/0229 |
| | | | | 455/426.1 |
| 2014/0373123 | A1* | 12/2014 | Kang | H04W 4/80 |
| | | | | 726/7 |
| 2015/0172391 | A1* | 6/2015 | Kasslin | H04W 52/0229 |
| | | | | 370/338 |
| 2015/0172902 | A1* | 6/2015 | Kasslin | H04L 67/16 |
| | | | | 370/328 |
| 2016/0100276 | A1 | 4/2016 | Viswanadham et al. | |
| 2016/0111038 | A1* | 4/2016 | Morita | G09G 3/3688 |
| | | | | 345/212 |
| 2016/0286341 | A1* | 9/2016 | Lee | H04W 84/18 |
| 2018/0176851 | A1* | 6/2018 | Lim | H04W 68/00 |
| 2018/0270876 | A1* | 9/2018 | Ding | H04W 8/005 |
| 2020/0186987 | A1* | 6/2020 | Choi | H04W 4/70 |
| 2020/0275250 | A1* | 8/2020 | Choi | H04W 12/033 |

FOREIGN PATENT DOCUMENTS

| | | |
|---|---|---|
| KR | 101762411 | 7/2017 |
| WO | 2016/167539 | 10/2016 |

* cited by examiner

【FIG. 1】
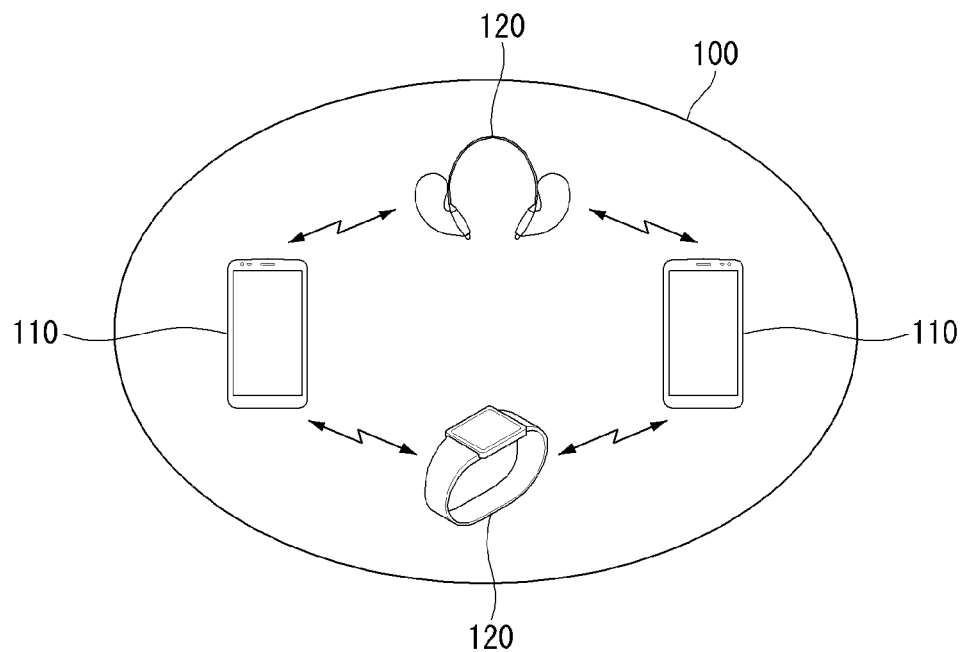

[FIG. 2]
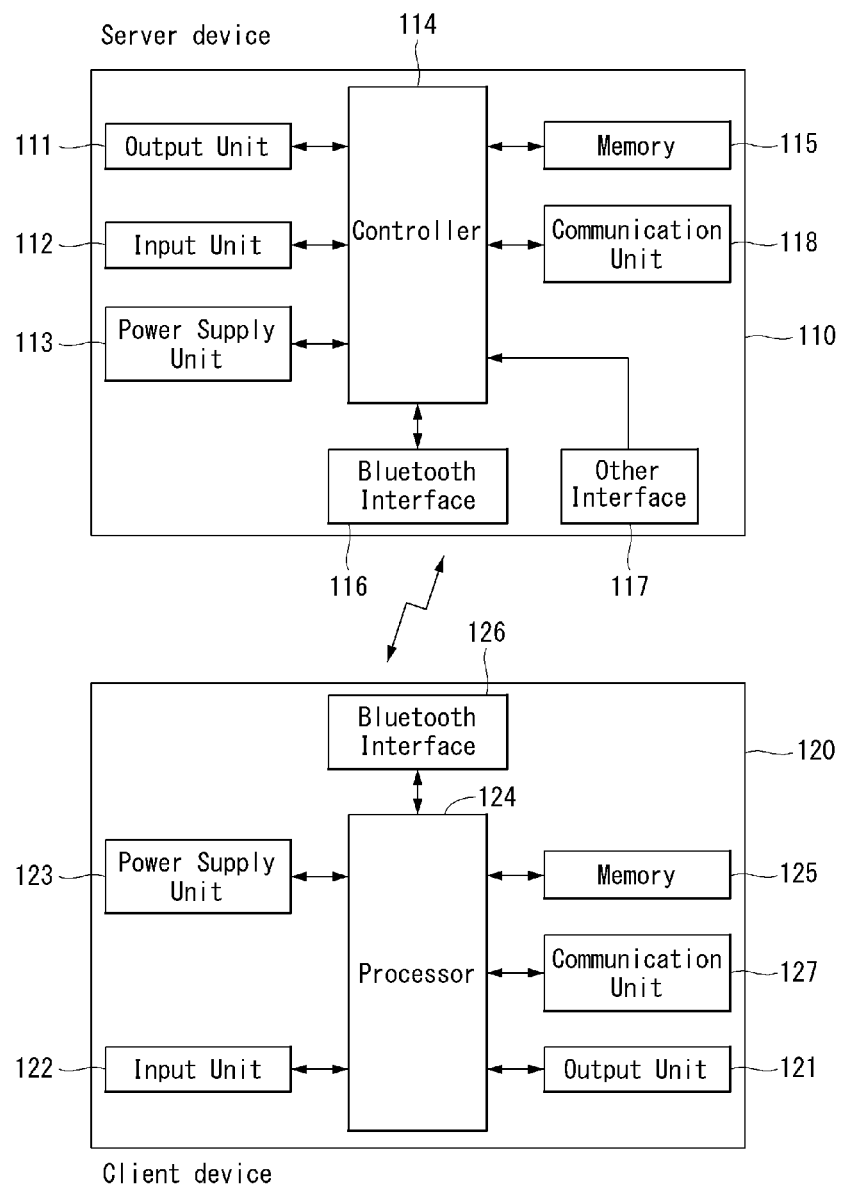

[FIG. 3]
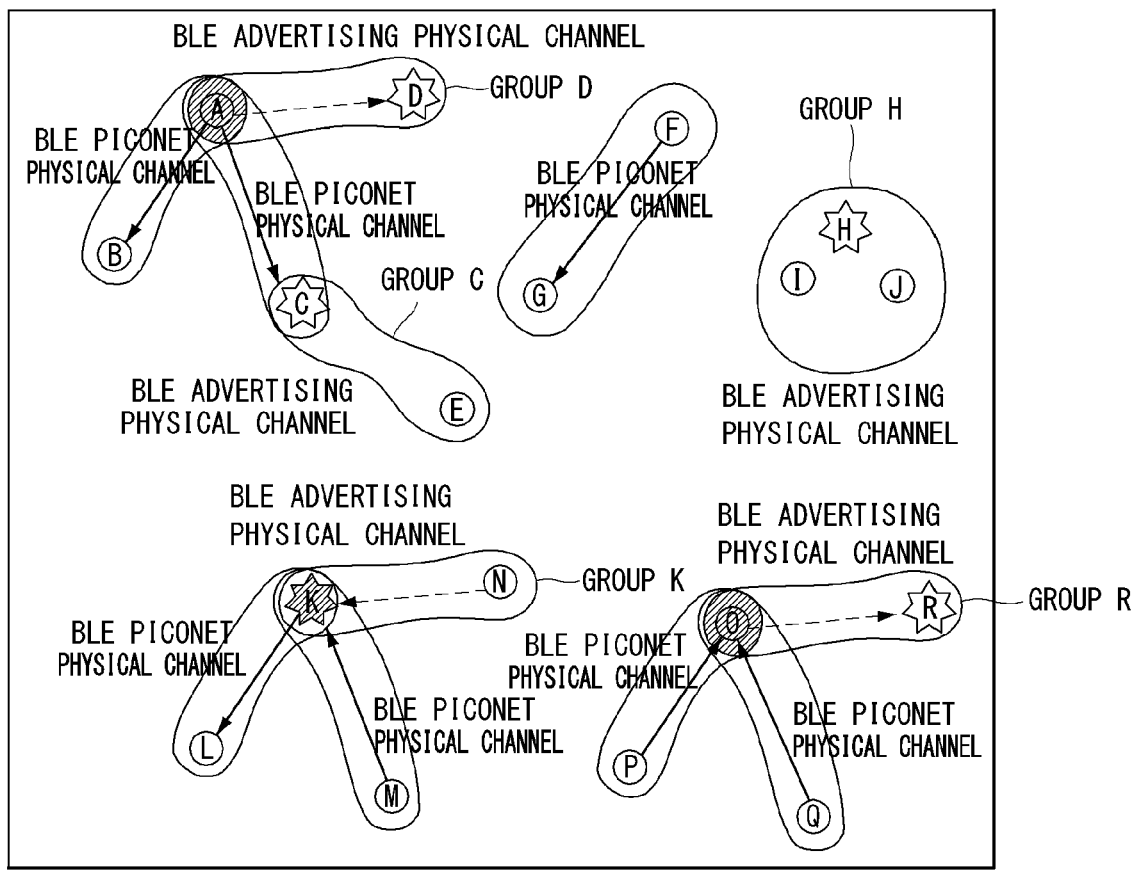

[FIG. 4]
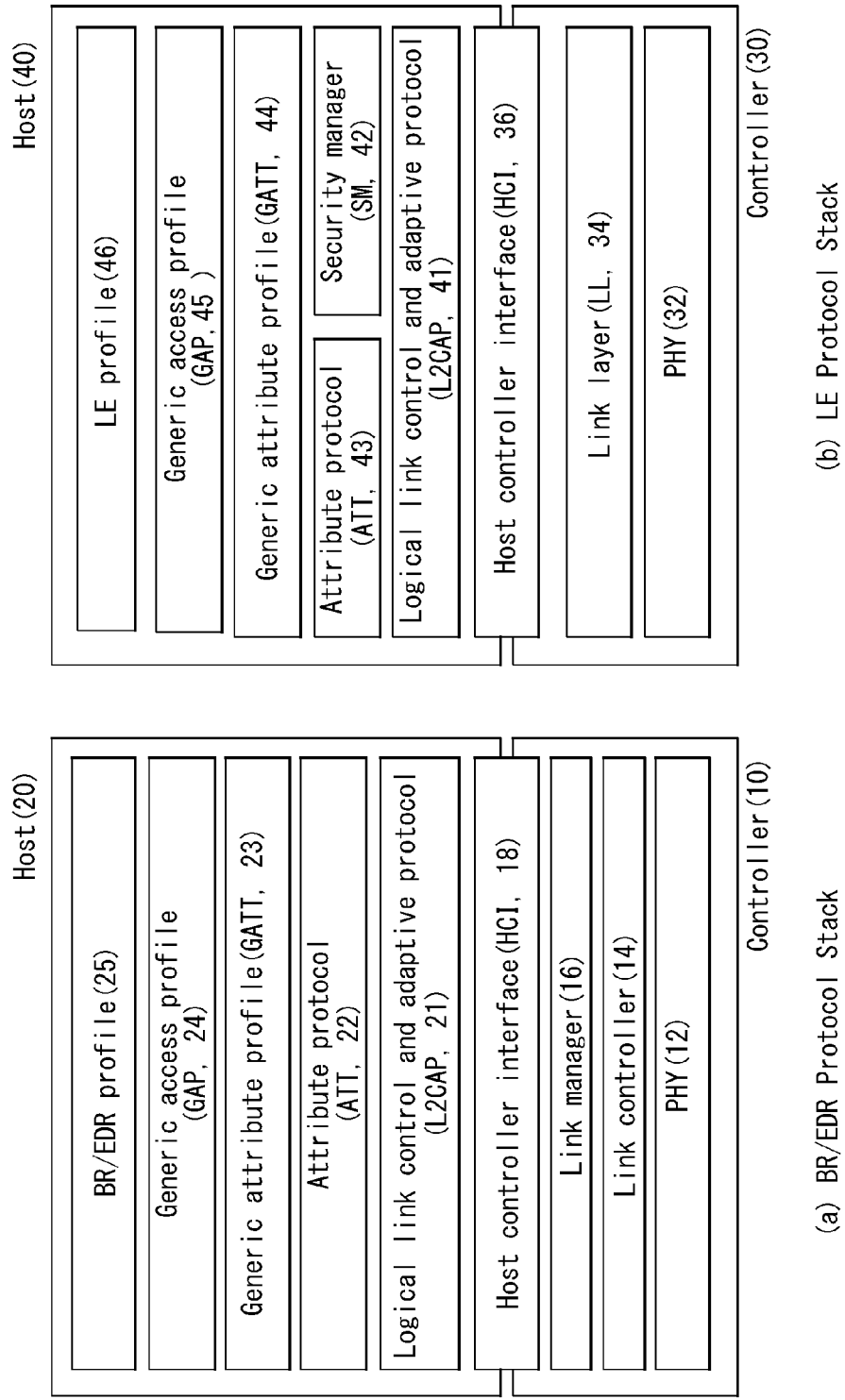

[FIG. 5]
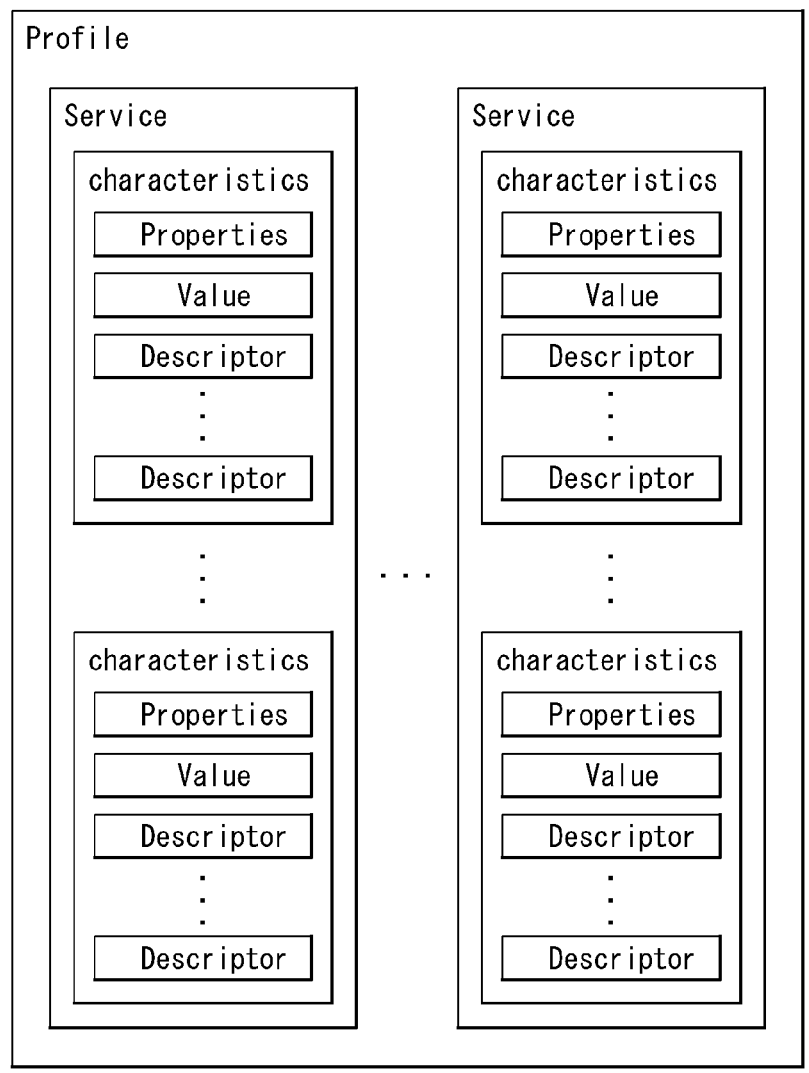

[FIG. 6]
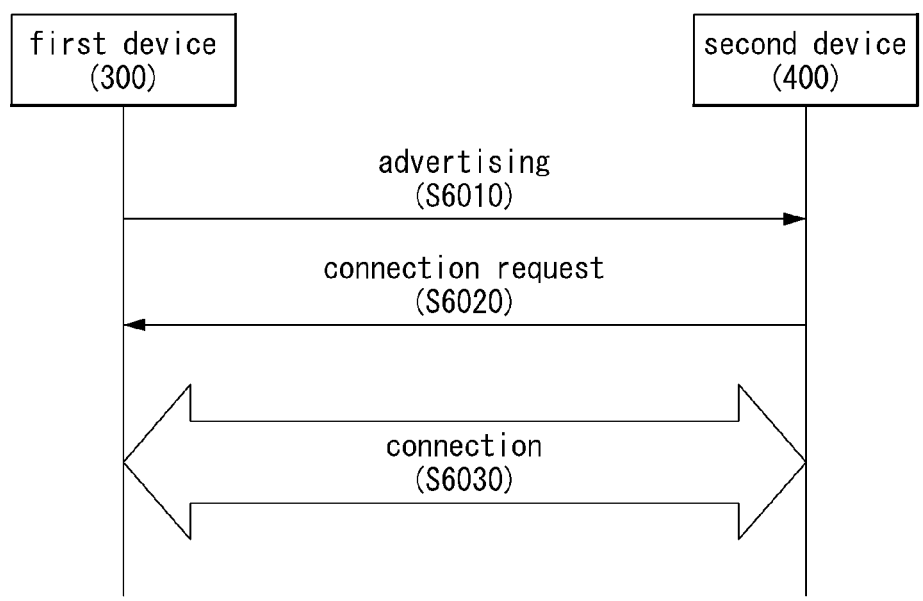

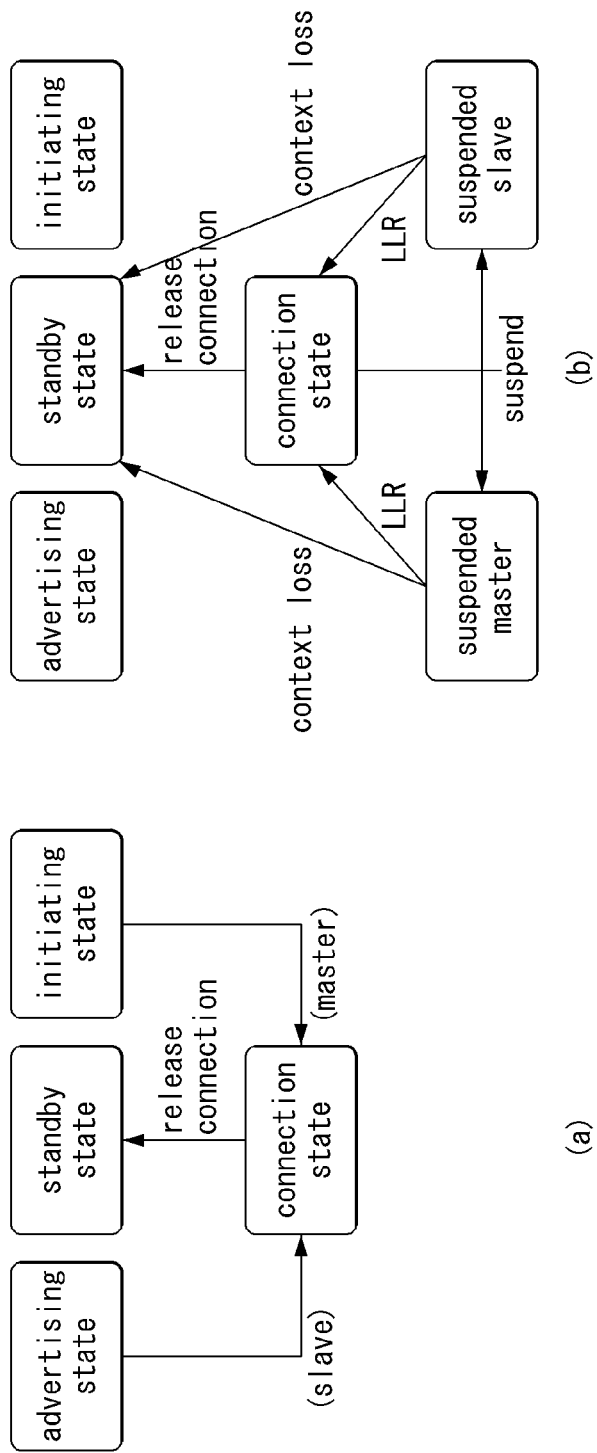
[FIG. 7]

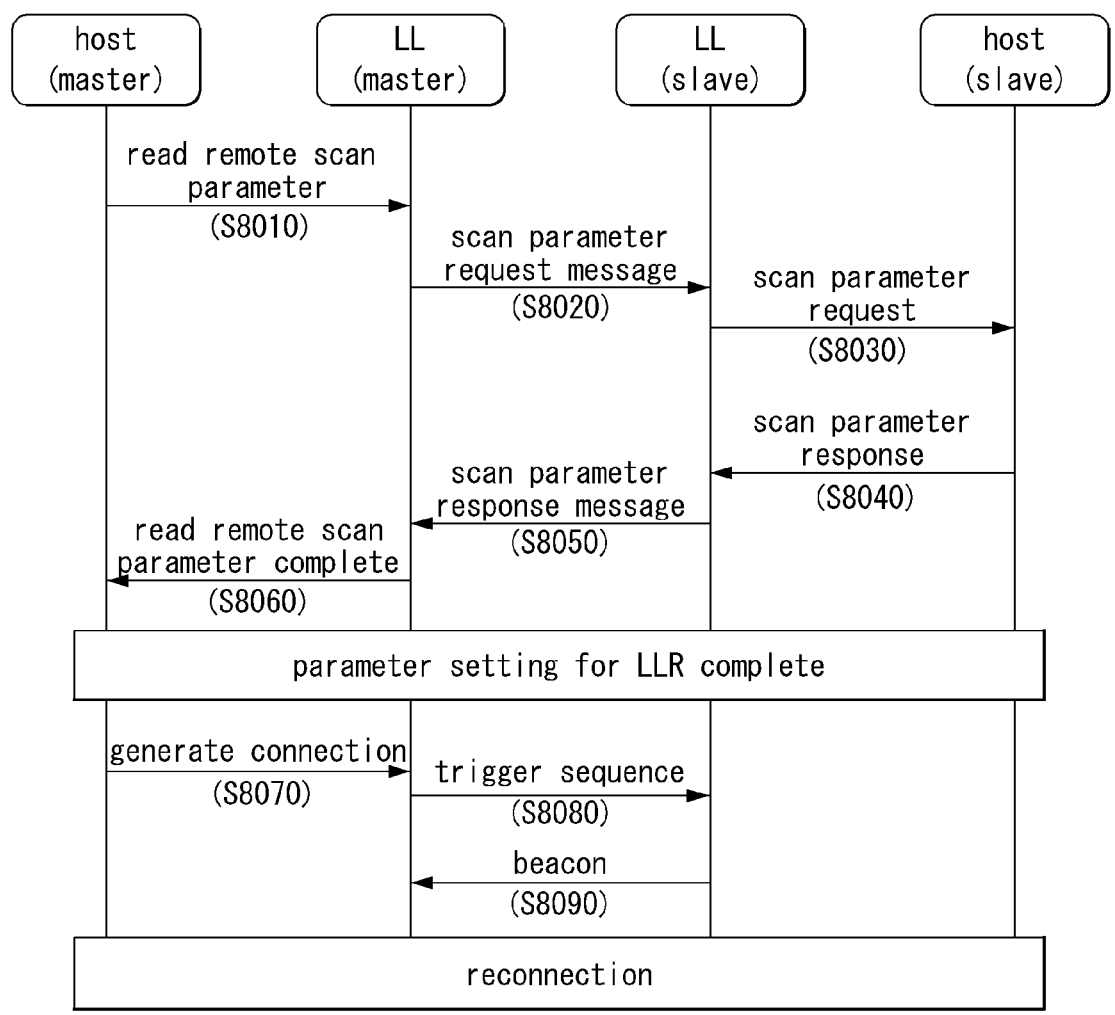
[FIG. 8]

| Command | OCF | Command Parameters | Return Parameters |
|---|---|---|---|
| LE_HCI_Read_Remote_Enhanced_Scan_Parameters | TBD | Connection_Handle | |

(b)

| Command | OCF | Command Parameters | Return Parameters |
|---|---|---|---|
| LE_HCI_Create_Connection_Enhanced | TBD | AdvA, Resume, Enhanced_Scan_Interval, Enhanced_Scan_Beacon_Interval, TargetA, Number_of_Channels, Channels[i], TX_PHYS, RX_PHYS, PHY_options | |

【FIG. 10】
| Command | OCF | Command Parameters | Return Parameters |
|---|---|---|---|
| LE_HCI_Enhanced_Scan_Parameters_Request_Reply | TBD | Connection_Handle, Typical_Enhanced_Scan_Interval, Typical_Enhanced_Scan_Beacon_Interval, Maximum_Enhanced_Scan_Interval, Maximum_Enhanced_Scan_Beacon_Interval, Number_of_Channels, Channels[i] ALL_PHYS TX_PHYS RX_PHYS PHY_options | Status |
【FIG. 11】
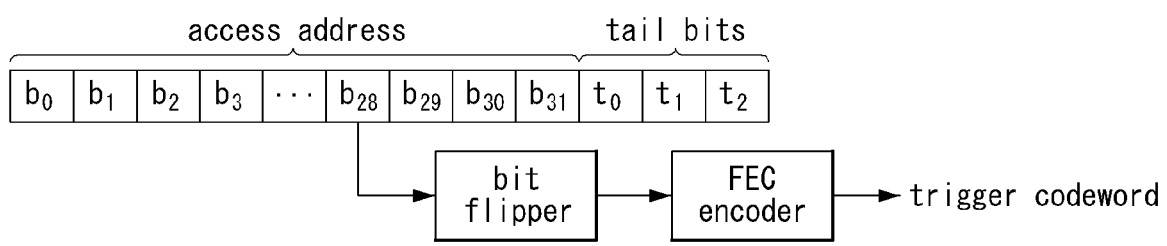

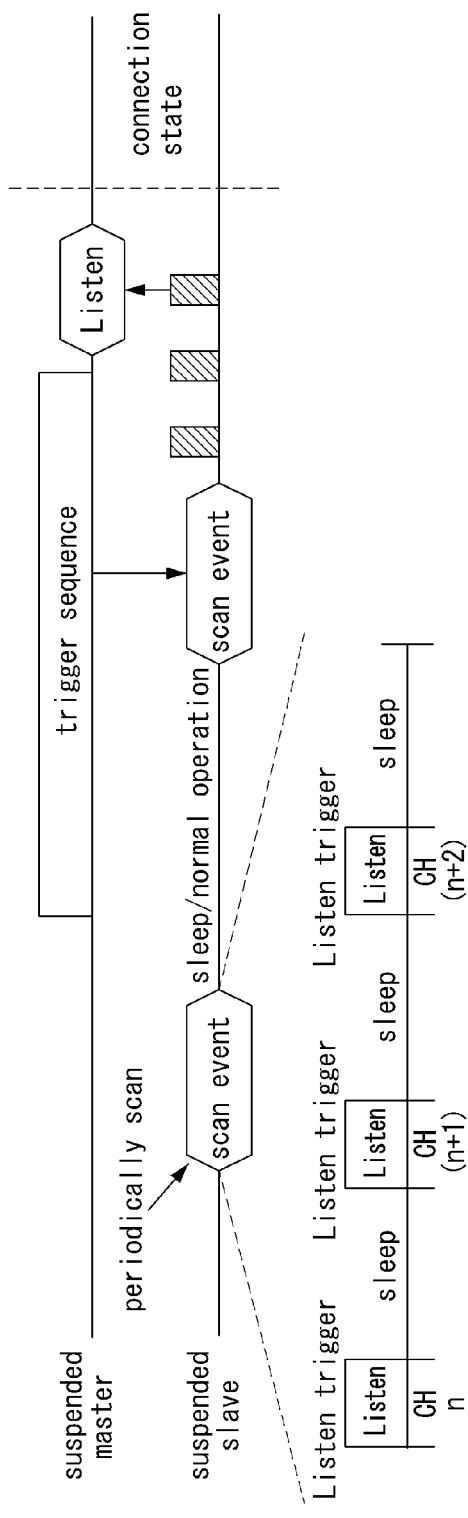
[FIG. 12]

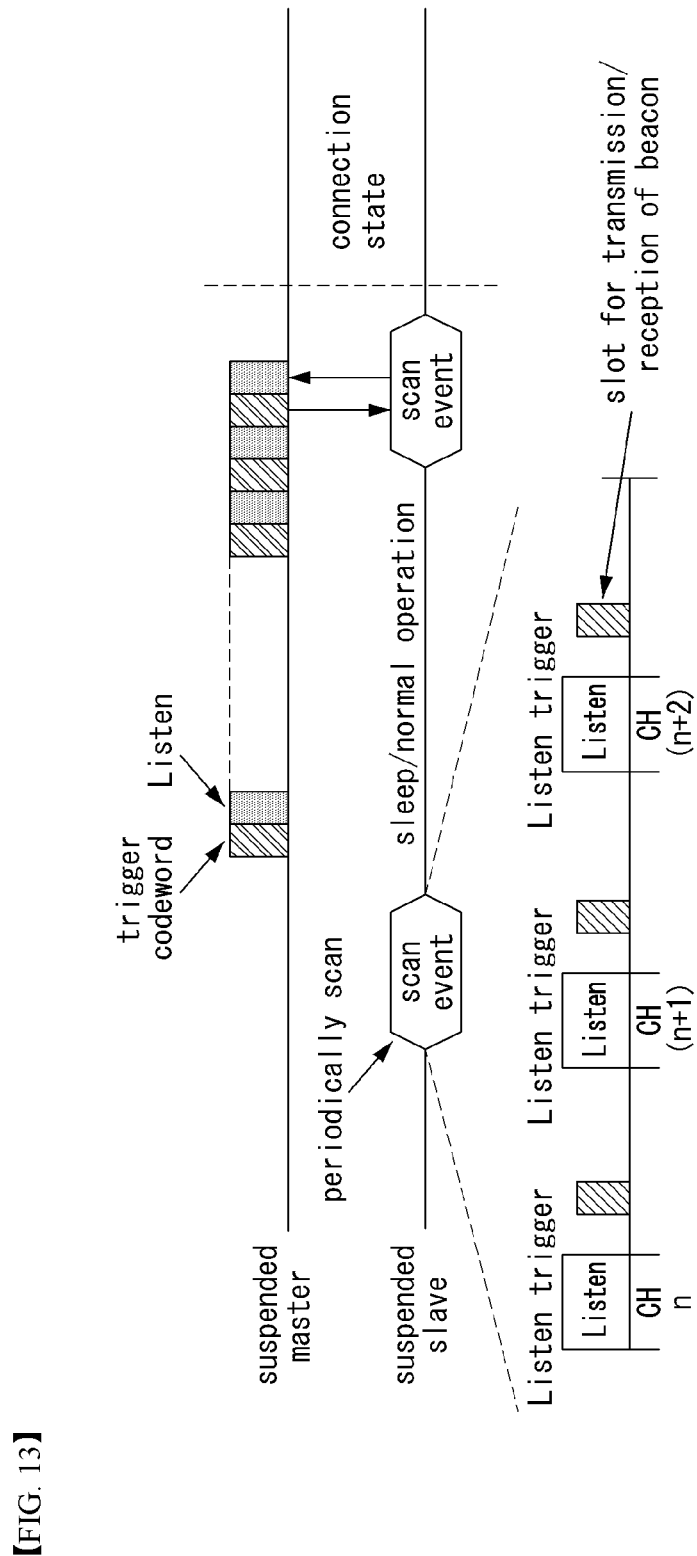
[FIG. 13]

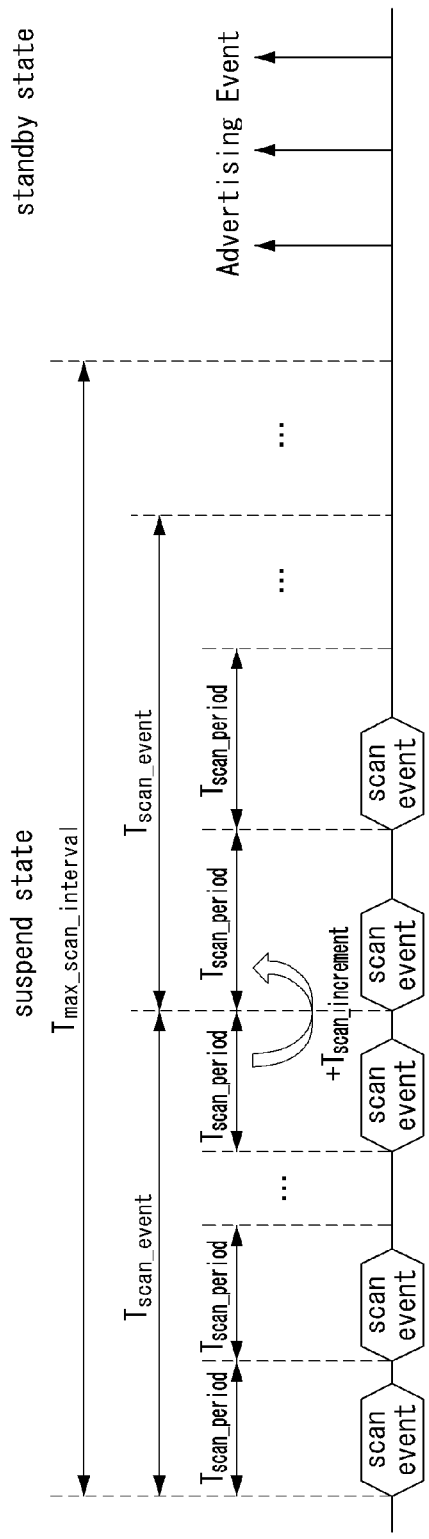
[FIG. 14]

[FIG. 15]
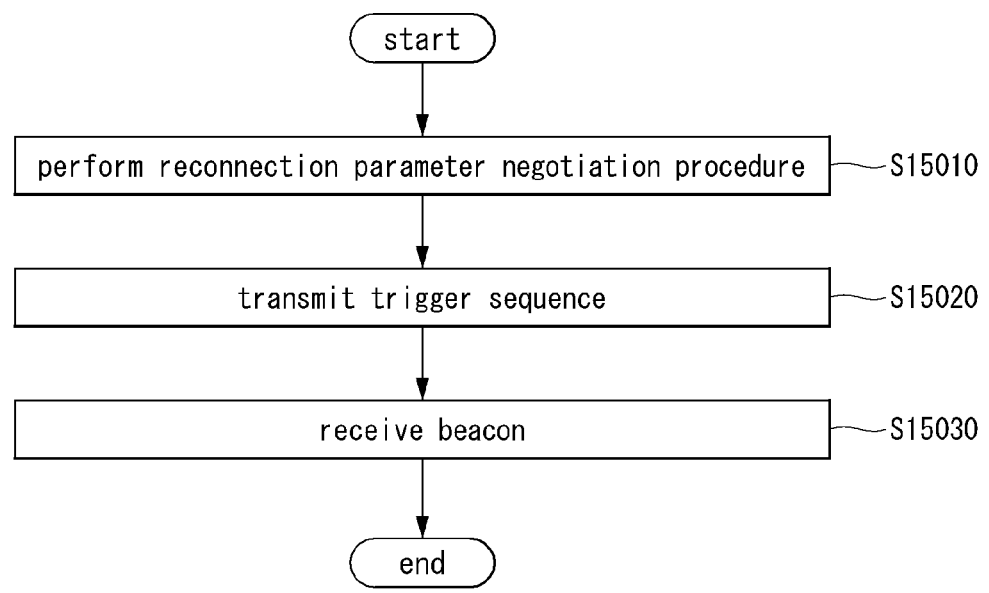

METHOD AND APPARATUS FOR ESTABLISHING CONNECTION BETWEEN DEVICES BY USING BLUETOOTH LOW ENERGY TECHNOLOGY

CROSS-REFERENCE TO RELATED APPLICATIONS

This application is the National Stage filing under 35 U.S.C. 371 of International Application No. PCT/KR2018/008975, filed on Aug. 7, 2018, which claims the benefit of U.S. Provisional Application No. 62/542,220, filed on Aug. 7, 2017, the contents of which are all hereby incorporated by reference herein in their entirety.

TECHNICAL FIELD

The present disclosure relates to a method and apparatus for forming a device-to-device connection using Bluetooth, the short-range technology, and in particular, to a method and apparatus for shortening the inter-device reconnection time using Bluetooth low energy (BLE) technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DETAILED DESCRIPTION OF THE INVENTION

Problems to be Addressed

For reconnection between devices that have been disconnected, the conventional Bluetooth LE technology needs to again perform the prior connection procedure. A better user experience requires reduced latency in inter-BLE device reconnection. However, the conventional BLE technology lacks definitions as to a connection procedure simplified over the legacy advertising/scanning.

Thus, the disclosure aims to define a link layer for carrying out a reconnection procedure in lower latency.

The present disclosure also aims to propose a parameter negotiation method for conducting a reconnection procedure in lower latency.

The present disclosure also aims for triggering codeword to perform a reconnection procedure in lower latency.

Objects of the disclosure are not limited to the foregoing, and other unmentioned objects would be apparent to one of ordinary skill in the art from the following description.

Technical Solution

According to an embodiment of the disclosure, a method performed by a first device for inter-device reconnection in a wireless communication system using Bluetooth low energy technology comprises performing a reconnection parameter negotiation procedure with a second device, transmitting a trigger sequence including at least one trigger codeword for requesting reconnection to the second device via a channel determined based on a result of the negotiation procedure, and receiving a beacon from the second device in response to the trigger sequence, wherein upon receiving the beacon, a reconnection may be formed between the first device and the second device.

Preferably, performing the negotiation procedure may include transmitting a first request message requesting scanning channel information for the trigger sequence to the second device and receiving a first response message including the scanning channel information from the second device in response to the first request message.

Preferably, the scanning channel information may include index information indicating at least one of three pre-defined advertising channels.

Preferably, performing the negotiation procedure may include transmitting a second request message requesting physical layer information used for transmission/reception of the trigger sequence to the second device and receiving a second response message including the physical layer information from the second device in response to the second request message.

Preferably, the physical layer information may include at least one of a transmission PHY parameter indicating a transmission preference physical layer, a reception PHY parameter indicating a reception preference physical layer, and a PHY option parameter designating an option for a physical layer.

Preferably, the method may further comprise generating the trigger codeword using an access address.

Preferably, if a physical layer used for transmission/reception of the trigger sequence is a coded PHY, a relatively shorter bit may be allocated to the trigger codeword.

Preferably, transmitting the trigger sequence may include alternately performing the transmission of the trigger codeword included in the trigger sequence and the reception of the beacon transmitted in response to the trigger codeword.

According to another embodiment, a first device in a method for inter-device reconnection in a wireless communication system using Bluetooth low energy technology comprises a communication unit for wiredly and/or wirelessly transmitting/receiving a signal to/from an external device and a controller functionally connected with the communication unit, wherein the controller performs a reconnection parameter negotiation procedure with a second device, transmits a trigger sequence including at least one trigger codeword for requesting reconnection to the second device via a channel determined based on a result of the negotiation procedure, and receives a beacon from the second device in response to the trigger sequence, wherein upon receiving the beacon, a reconnection may be formed between the first device and the second device.

Advantageous Effects

According to the embodiments of the disclosure, devices which have been disconnected may be reconnected in low latency and, thus, the user experience may be enhanced.

Effects of the disclosure are not limited to the foregoing, and other unmentioned effects would be apparent to one of ordinary skill in the art from the following description.

BRIEF DESCRIPTION OF DRAWINGS

FIG. 1 is a schematic view illustrating an example of a wireless communication system using Bluetooth low energy (BLE) technology proposed in this disclosure.

FIG. 2 illustrates an internal block diagram of an example of a device implementing methods proposed in this disclosure.

FIG. 3 illustrates an example of BLE topology.

FIG. 4 is a view illustrating an example of Bluetooth communication architecture to which methods proposed in this disclosure may be applied.

FIG. 5 is a view illustrating an example of a structure of a generic attribute profile (GATT) of BLE.

FIG. 6 is a flow chart illustrating a method of forming a connection using BLE between devices.

FIG. 7 is a link layer state diagram according to an embodiment of the disclosure.

FIG. 8 is a flowchart illustrating a method of performing a reconnection via a parameter negotiation procedure for reconnection according to an embodiment of the disclosure.

FIGS. 9 and 10 are views illustrating a control message format of a host controller interface according to an embodiment of the disclosure.

FIG. 11 is a view illustrating a method of generating a trigger codeword according to an embodiment of the disclosure.

FIG. 12 is a view illustrating a method of inter-device reconnection according to an embodiment of the disclosure.

FIG. 13 is a view illustrating a method of inter-device reconnection according to an embodiment of the disclosure.

FIG. 14 is a view illustrating a method of scan period control after a connection is released according to an embodiment of the disclosure.

FIG. 15 is a flowchart illustrating a method of inter-device reconnection according to an embodiment of the disclosure.

MODE FOR CARRYING OUT THE INVENTION

The aforementioned objects, features and advantages of the disclosure will become more apparent through the following detailed description with respect to the accompanying drawings. Hereinafter, the embodiments of the disclosure will be described with reference to the accompanying drawings, in which like numbers refer to like elements throughout the specification. In describing the disclosure, a detailed description of known techniques associated with the disclosure unnecessarily obscure the gist of the disclosure, it is determined that the detailed description thereof will be omitted.

Hereinafter, a terminal related to the disclosure will be described in detail with reference to the accompanying drawings. In the following description, usage of suffixes such as 'module', 'part' or 'unit' used for referring to elements is given merely to facilitate explanation of the disclosure, without having any significant meaning by itself.

FIG. 1 is a schematic view illustrating an example of a wireless communication system using Bluetooth low energy (BLE) technology proposed in this disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be referred to as a data service device, slave device, slave, server, conductor, host device, gateway, sensing device, monitoring device, or first device, and the client device 110 may also be referred to as a master device, master, client, member, sensor device, sink device, collector, second device, or third device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

There are a few devices that measure human body activities using a specific device, but there are no devices capable of transmitting measured data via Bluetooth to display specific data values to users.

Thus, the disclosure proposes a method of measuring human body activities, transmitting the measured data via Bluetooth LE, processing the data, and providing the processed data to users.

FIG. 2 illustrates an internal block diagram of an example of a device implementing methods proposed in this disclosure.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As set forth above, BLE technology has a small duty cycle and is able to significantly reduce power consumption via low data transmission rate. Thus, the power supply units may supply power necessary for operation of each component, even with low output power (10 mW (10 dBm) or less).

The user input interfaces 112 and 122 refer to modules providing a user input such as a screen button to the controllers to enable the user to control an operation of the devices.

FIG. 3 illustrates an example of BLE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the methods proposed in the disclosure is implementable.

Referring to FIG. 4, FIG. 4 (a) shows an example of a protocol stack of the Bluetooth BR (Basic Rate)/EDR (Enhanced Data Rate), and FIG. 4 (b) shows an example of a protocol stack of the Bluetooth Low Energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 10 may include a PHY layer 12, a Link Controller layer 14 and a Link Manager layer 16.

The PHY layer 12 is the layer of transmitting and receiving a radio signals of 2.4 GHz, and may transmit data by hopping 79 RF channels in the case of using the Gaussian Frequency Shift Keying (GFSK) modulation.

The Link Controller layer 14 plays the role of transmitting a Digital Signal, selects the channel sequence of hopping 1400 times per second, and transmits the time slot of 625 us length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, a security manager (SM) 22, an attribute protocol 23, a generic attribute profile (GATT) 24, a generic access profile (GAP) 25, and a BR/EDR profile 26.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM) 22 is a protocol for authenticating the device and providing key distribution.

The generic attribute profile (GATT) 24 may be operated as a protocol that describes how the attribute protocol 23 is used when services are configured. For example, the generic attribute profile 24 may be operated to specify how ATT attributes, along with services, are grouped and to describe features associated with the services.

Thus, the generic attribute profile 24 and the attribute protocol (ATT) 23 may use the features to describe the state of the device and the services and to describe how the features are related to each other and are used.

The attribute protocol 23 and the profiles 26 define services (profiles) using the Bluetooth BR/EDR and an application protocol for exchanging data, and the generic access profile (GAP) 25 defines a scheme for device discovery, connection, and providing information to the user and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the logical link control and the adaptation protocol (L2CAP) 41, the Security Manager (SM) 42, the Attribute Protocol (ATT) 43, the Generic Attribute Profile (GATT) 44, the Generic Access Profile 45 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

Bluetooth LE uses three fixed channels (one for signaling CH, another for security manager, and the other for attribute protocol).

In contrast, basic rate/enhanced data rate (BR/EDR) uses dynamic channels and supports, e.g., protocol service multiplexer, retransmission, and streaming mode.

The security manager (SM) 42 is a protocol for authenticating the device and providing key distribution.

The attribute protocol (ATT) 43 defines a rule for accessing the data of the other party's device in a server-client structure. The ATT comes up with six message types (Request, Response, Command, Notification, Indication, Confirmation) as follows.

① Request and Response message: Request message is a message for the client device to send a request for specific information to the server device, and Response message is a message responsive to the Request message and is transmitted from the server device to the client device.

② Command message: Command message is a message that the client device transmits to the server device to indicate a command for a specific operation. The server device transmits no response to the Command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46 is a GATT-dependent profile and applies primarily to Bluetooth LE device. The LE profile 46 may include, e.g., Battery, Time, FindMe, Proximity, Time, Object Delivery and Service, and the details of GATT-based Profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to the advertising device via an advertising physical channel to send a request for additional user data to the advertising device. In response to the scan request, the advertising device transmits a scan response containing additional data requested by the scanning device via the advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is carried out asymmetrically. The Bluetooth device attempting to scan other devices around is referred to as a discovering device, and the discovering device listens to discover devices advertising scannable advertising events. The Bluetooth device that is discovered by another device and put to use is referred to as a discoverable device, and the discoverable device actively broadcasts advertising events via a physical channel to be scannable by other devices.

The discovering device and the discoverable device both may already have connection with other Bluetooth devices over the pico net.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure FIG. 5 is a view illustrating an example of a structure of GATT Profile of the Bluetooth low energy.

Referring to FIG. 5, the structure for exchange of Profile Data of the Bluetooth Low Energy is shown.

In detail, the GATT defines a method for exchanging data using a service between Bluetooth LE devices and a characteristic.

In general, a device nearby (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present disclosure proposes a method for measuring and storing, by a sensor, human activities using a GATT-based operation structure of Bluetooth low-energy (BLE) and retrieving, by a client, stored information from the sensor.

FIG. 6 is a flow chart illustrating a method of forming a connection using BLE between devices.

As illustrated in FIG. 6, for BLE connection between a first device 300 and a second device 400, the first device 300 transmits an advertising message to the second device (S6010).

As described above, the advertising message may be used to provide own information to another device by utilizing BLE, and include various types of information such as service information, user information, and the like, provided by the device.

The second device 400 checks the information included in the advertising message transmitted from the first device 300 and transmits a connection request message for requesting a BLE connection to the first device 300 (S6020), whereby the first device 300 and the second device 400 form a BLE connection (S6030).

FIG. 7 is a link layer state diagram according to an embodiment of the disclosure.

FIG. 7(a) illustrates a link layer state diagram in the conventional Bluetooth process. FIG. 7(b) illustrates a link layer state diagram according to a Bluetooth process proposed in the disclosure.

Referring to FIG. 7(a), the conventional Bluetooth LE process fails to define a separate procedure for reconnection. The operations of the slave device may be divided into an advertising state, a connection state, and a standby state due to the release of connection, and the operations of the master device may be divided into an initiating state, a connection state, and a standby state.

In the above-described conventional Bluetooth LE process, if the device with low radio activity frequency is disconnected, reconnection is attempted for inter-device operation, but this has the drawback of long latency. Further, low latency reconnection (LLR) technology which is underway for standardization on BR/EDR is impossible to simply apply to LE.

Thus, as shown in FIG. 7(b), a low latency over the procedure of newly initiating a connection in the standby state may be obtained by defining a suspend state for reconnection.

In other words, in the Bluetooth process as proposed in the disclosure, only the device attempting initial LE connection stays in the standby state, and other devices, which have been connected once, may enter the suspend state, rather than the standby state.

Referring to FIG. 7(b), the slave device, after operating in the advertising state and connection state, may operate, as the suspended master, in the suspend state. At this time, it may operate in the connection state upon low-latency reconnection, and upon context loss, it may operate in the standby state.

The master device, after operating in the initiating state and connection state, may operate, as the suspended slave, in the suspend state. At this time, it may operate in the connection state upon low-latency reconnection, and upon context loss, it may operate in the standby state.

Unlike in the standby state, the suspended master or the suspended slave may have stored an access history including the unique address of the host allocated thereto. Quick reconnection may be established to the device, once connected, based on the basic information.

FIG. 8 is a flowchart illustrating a method of performing a reconnection via a parameter negotiation procedure for reconnection according to an embodiment of the disclosure.

Referring to FIG. 8, according to an embodiment of the disclosure, there is proposed a scheme of low-latency reconnection (LLR) triggering physical channel information exchange between two devices connected before.

Specifically, the host of the master device transmits a control message indicating to read a scan parameter to the link layer (LL) of the master device via a host controller interface (HCI) command (S8010).

In the disclosure, the control message indicating to read the scan parameter may be referred to as an LE_HCI_Read_Remote_Enhanced_Scan_Parameters command, the message format of which is described below in detail.

The LL of the master device transmits a request message for requesting the scan parameter to the LL of the slave device (S8020). The LL of the slave device transmits a request message (or control message) for requesting the scan parameter to the host of the slave device via the HCI (S8030).

In response to the request message, the host of the slave device transmits a control message containing the scan parameter to the LL of the slave device via the HCI (S8040). In the disclosure, the scan parameter-containing control message may be referred to as an LE_HCI_Enhanced_Scan_Parameters_Request_Reply command, the message format of which is described below in detail.

In response to the request message for requesting the scan parameter, the LL of the slave device transmits a response message containing the scan parameter to the LL of the master device (S8050).

The LL of the master device transmits, to the host of the master device, a notification message indicating that the scan parameter has been read out (S8060). By the above-described procedure, the master device and the slave device may complete the parameter setting procedure for low-latency reconnection.

After the connection between the master device and the slave device is released, the host of the master device transmits a control message for requesting to generate a connection to the LL of the master device via an HCI command so as to form a reconnection (S8070).

In the disclosure, the control message for requesting to generate a connection for reconnection purposes may be referred to as an LE_HCI_Create_Connection_Enhanced command, the message format of which is described below in detail.

To request reconnection, the LL of the master device transmits a trigger sequence including a plurality of trigger codewords to the LL of the slave device (S8080).

In response to the trigger sequence, the LL of the slave device transmits a beacon to the LL of the master device (S8090). Thus, a reconnection may be formed between the first device and the second device.

FIGS. 9 and 10 are views illustrating a control message format of a host controller interface according to an embodiment of the disclosure.

Referring to FIG. 9(a), the host of the master device may transmit a control message indicating to read the scan parameter to the LL of the master device via an HCI command.

The control message indicating to read the scan parameter may be referred to as an LE_HCI_Read_Remote_Enhanced_Scan_Parameters command, and the LE_HCI_Read_Remote_Enhanced_Scan_Parameters command may include a connection handle parameter to request to read parameters necessary for reconnection.

Referring to FIG. 9(b), the host of the master device may transmit, via the HCI command to the LL of the master device, a control message to request to generate a connection so as to form a reconnection.

The control message to request to generate a connection so as to form a reconnection may be referred to as an LE_HCI_Create_Connection_Enhanced command.

The LE_HCI_Create_Connection_Enhanced command may include a parameter indicating at least one of the device address, scan interval information, beacon interval information, target device address, number of channels, channel index information, transmission PHY indicating transmission preference physical layer, reception PHY indicating reception preference physical layer, or PHY option designating option for physical layer.

Referring to FIG. 10, the host of the slave device may transmit a control message including the scan parameter. The scan parameter-containing control message may be referred to as an LE_HCI_Enhanced_Scan_Parameters_Request_Reply command.

The LE_HCI_Enhanced_Scan_Parameters_Request_Reply command may include a parameter indicating at least one of the connection handle for requesting to read parameters necessary for reconnection, scan interval information, beacon interval information, target device address, number of channels, channel index information, transmission PHY indicating transmission preference physical layer, reception PHY indicating reception preference physical layer, or PHY option designating option for physical layer.

According to an embodiment, the low-latency reconnection triggering channel may be determined via a reconnection parameter negotiation procedure. Here, the triggering channel refers to a channel for transmitting a trigger sequence including a plurality of trigger codewords for requesting reconnection.

The host of the master device may request scanning channel information of the slave device, thereby determining the triggering channel. In this case, the HCI command shown in FIG. 9(a) may be used. The triggering channel may include at least one of three pre-defined advertising channels.

According to an embodiment, the low-latency reconnection triggering PHY (also referred to as physical layer) may be determined via a reconnection parameter negotiation procedure. Here, the triggering PHY refers to the physical layer used for transmission/reception of the trigger sequence.

The host of the master device may receive the transmission PHY parameter indicating the slave transmission preference physical layer, the reception PHY parameter indicating the reception preference physical layer, and/or the PHY option designating an option for physical layer, determining the transmission PHY of the triggering sequence.

FIG. 11 is a view illustrating a method of generating a trigger codeword according to an embodiment of the disclosure.

As set forth above, the device may transmit a reconnection request message. The reconnection request message may include a trigger sequence. The trigger sequence may be constituted of a plurality of trigger codewords.

According to an embodiment of the disclosure, the device may generate trigger codewords using the access address. In particular, the device may generate trigger codewords according to the PHY where the trigger sequence is transmitted/received. In other words, the trigger codewords may be generated according to the PHY packet format for reconnection attempt.

Referring to FIG. 11, the trigger codeword for coded PHY may be generated by padding tail bits to the access address. As an example, the access address may be 32-bit long, and the tail bits may be three-bit long (e.g., {1 1 1}). The 35-bit tail-padded access address may be inverted via the XOR operation with 0xFFFFFFFF.

The trigger sequence may be generated via forward error correction (FEC) encoding. At this time, S=2, and S=8, for example. If S=2, the trigger sequence may have 70 bits and, if S=8, the trigger sequence may have 280 bits.

According to an embodiment, the trigger codeword for uncoded PHY may be inverted by XORing the 32-bit access address with 0xFFFFFFFF.

According to an embodiment, the triggering cycle may be adjusted according to the ratio of the triggering cycle to the scan duty cycle. As an example, (triggering cycle)/(scan duty cycle) may be set to be a predetermined, specific value (e.g., 13%) or less. If the trigger codeword is scanned with the coded PHY, the scanning period may be fixed to the maximum value.

FIG. 12 is a view illustrating a method of inter-device reconnection according to an embodiment of the disclosure.

According to an embodiment of the disclosure, a method of initiating/accepting low latency reconnection between two devices disconnected from each other is proposed.

Referring to FIG. 12, if the connection between the master device and the slave device is released, the state of the two devices switches from the connection state to the suspend state. In other words, the master may switch to the suspended master, and the slave may switch to the suspended slave.

For establishing a reconnection, the suspended master may transmit a trigger sequence made up with trigger codewords. The trigger sequence may also be denoted a reconnection request message. At this time, the suspended master may transmit the trigger sequence to the suspended slave using a channel determined by the host.

The channel may be determined via the reconnection parameter negotiation procedure described above in connection with FIGS. 8 to 10. While the trigger sequence is transmitted, only one RF channel may be used.

To form a reconnection, the suspended slave may periodically scan the trigger sequence via a scan window (or enhanced scan window).

If the suspended slave succeeds in receiving the trigger sequence or trigger codewords, the suspended slave may periodically transmit beacons. The beacon may also be referred to as a response message for accepting the reconnection request.

Upon receiving a beacon, the suspended master may transmit an ACK to the suspended slave. The suspended master and the suspended slave may switch into the connection state.

Although FIG. 12 assumes that the trigger sequence or trigger codewords are scanned (or listen) via three channels during the scan event, the disclosure is not limited thereto, and the trigger sequence may be scanned via a different number of channels.

If the trigger sequence or trigger codewords are scanned (or listen) via three channels, the trigger codewords may be scanned alternately using the three channels, with a sleep interval left between the channels during one scan event, as shown in FIG. 12.

FIG. 13 is a view illustrating a method of inter-device reconnection according to an embodiment of the disclosure.

According to an embodiment of the disclosure, the suspended master may form a reconnection in lower latency by alternately and repeatedly performing transmission of trigger codeword and beacon listening.

Although FIG. 13 assumes that the trigger sequence or trigger codewords are scanned (or listen) via three channels during the scan event, the disclosure is not limited thereto, and the trigger sequence may be scanned via a different number of channels.

The suspended master may transmit the trigger sequence constituted of trigger codewords to the suspended slave. The trigger sequence may also be denoted a reconnection request message. The suspended master may transmit the trigger sequence to the suspended slave using a channel determined by the host.

The channel may be determined via the reconnection parameter negotiation procedure described above in connection with FIGS. 8 to 10. While the trigger sequence is transmitted, only one RF channel may be used. At this time, the suspended master may alternately perform transmission of trigger codeword and beacon listening as shown in FIG. 13.

The suspended slave may periodically scan the trigger sequence via a scan window (or enhanced scan window). At this time, if the reception of trigger codeword succeeds during the scan window, the suspended slave may immediately transmit a beacon.

If trigger codeword listening is performed multiple times during one scan event, a slot for transmitting a beacon according to the result of each listening may be allocated. The beacon may also be referred to as a response message for accepting the reconnection request.

Upon receiving a beacon, the suspended master may transmit an ACK to the suspended slave. Thereafter, the suspended master and the suspended slave may switch into the connection state.

Proposed is a method of performing a reconnection procedure between devices that used to communicate using a coded PHY in the connection state, according to another embodiment. According to the instant embodiment, more efficient triggering may be achieved in a long range environment.

Specifically, the suspended master may transmit a trigger sequence made up with trigger codewords. The trigger sequence may also be denoted a reconnection request message. At this time, the suspended master may transmit the trigger sequence to the suspended slave using a channel determined by the host.

At this time, if the physical layer used for transmission/reception of the trigger sequence is the coded PHY, relatively shorter bits may be allocated to the trigger codeword. In other words, short codewords relative to the case of uncoded PHY may be used considering the scanning duty cycle by applying the coded PHY.

The channel may be determined via the reconnection parameter negotiation procedure described above in connection with FIGS. 8 to 10. While the trigger sequence is transmitted, only one RF channel may be used.

As set forth above, the suspended slave may periodically scan the trigger sequence via a scan window (or enhanced scan window).

If the suspended slave succeeds in receiving the trigger sequence or trigger codewords, the suspended slave may periodically transmit beacons. The beacon may also be referred to as a response message for accepting the reconnection request. The suspended slave may restore the codewords by performing forward error correction (FEC) decoding on the trigger codewords received while scanning, using $S=2$ or $S=8$ and may then transmit a beacon to the suspended master.

Upon receiving a beacon, the suspended master may transmit an ACK to the suspended slave. The suspended master and the suspended slave may switch into the connection state.

FIG. 14 is a view illustrating a method of scan period control after a connection is released according to an embodiment of the disclosure.

Referring to FIG. 14, the power consumption in the suspend state may be reduced by adjusting the scan period. In other words, in the case where the suspended slave fails to receive a trigger codeword, the scan period may be increased to reduce power consumption.

In the disclosure, the first scan event denotes a period during which substantially scanning is performed on the trigger codeword. The scan period denotes the period during which the first scan event occurs. The second scan event may be split into a plurality of scan periods. The first scan period may be included in the scan period. The maximum scan interval denotes the duration of the suspend state, and the maximum scan interval may be split into a plurality of second scan events.

If no trigger codeword is received during the second scan event (i.e., T_(scan event)), the second scan event, which is T_(scan period), may be updated to T_(scan period)+T_(scan increase). That is, after a predetermined time elapses, the scan period may be extended to reduce power consumption.

Meanwhile, the scan period may be fixed without extension to meet the duty cycle constraint in use of the coded PHY.

If no trigger codeword is received until the maximum scan interval, i.e., the maximum duration, is met, the suspend state may switch into the standby state. In this case, the suspended slave may switch, in its role, to the advertiser, periodically broadcasting advertising messages.

FIG. 15 is a flowchart illustrating a method of inter-device reconnection according to an embodiment of the disclosure.

Referring to FIG. 15, it is assumed that the first device is the suspended master device, and the second device is the suspended slave device.

The first device performs a reconnection parameter negotiation procedure with the second device (S15010). At this time, the first device may perform the reconnection parameter negotiation procedure with the second device as described above in connection with FIGS. 8 to 10.

As set forth above, the first device may transmit a first request message for requesting scanning channel information for the trigger sequence to the second device. In response to the first request message, the first device may receive a first response message including scanning channel information from the second device. At this time, the scanning channel information may include index information indicating at least one of three pre-defined advertising channels.

As set forth above, the first device may transmit a second request message for requesting physical layer information used for transmission/reception of the trigger sequence to the second device. In response to the second request message, the first device may receive a second response message including physical layer information from the second device. At this time, the physical layer information may include at least one of the transmission PHY parameter indicating the transmission preference physical layer, the reception PHY parameter indicating the reception preference physical layer, and the PHY option parameter designating an option for physical layer.

The first device may transmit a trigger sequence including at least one trigger codeword for requesting reconnection to the second device via a channel determined based on the result of the negotiation procedure (S15020).

As described above in connection with FIG. 11, the step of generating the trigger codeword using the access address may be carried out. According to an embodiment, given a long-range environment, if the physical layer used for transmission/reception of the trigger sequence is the coded PHY, relatively shorter bits may be allocated to the trigger codeword.

As described above in connection with FIG. 13, according to an embodiment, the first device may alternately perform the transmission of the trigger codeword included in the trigger sequence and the reception of a beacon transmitted in response to the trigger codeword.

In response to the trigger sequence, the first device receives a beacon from the second device (S15030). By receiving the beacon, a reconnection may be formed between the first device and the second device.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

The above-described preferred embodiments of the disclosure have been provided for illustration purposes, and it will be easily appreciated by one of ordinary skill in the art that various changes or changes may be made thereto or may add or be replaced with other embodiments, without departing from the technical spirit and scope of the disclosure as defined in the appended claims.

The invention claimed is:

1. A method performed by a first device for inter-device reconnection in a wireless communication system using Bluetooth low energy technology, the method comprising:
    entering from a connection state to a suspend state based on that a pre-established connection with a second device is disconnected;
    performing a reconnection parameter negotiation procedure with the second device;
    transmitting a trigger sequence including at least one trigger codeword for requesting a reconnection to the second device via a channel determined based on a result of the negotiation procedure,
    wherein a length of the trigger sequence is differently allocated based on whether a PHY to which is applied to a transmission of the trigger sequence is a coded PHY or an uncoded PHY;
    performing a beacon listening for receiving a beacon transmitted by the second device in response to the trigger sequence,
    wherein transmitting the trigger sequence and performing the beacon listening are performed alternately and repeatedly until the first device receives the beacon from the second device,
    wherein upon receiving the beacon, the reconnection is formed between the first device and the second device, and
    wherein a state of the first device is transitioned from the suspend state to the connection state based on the formed reconnection.

2. The method of claim 1, wherein performing the negotiation procedure includes:

transmitting a first request message requesting scanning channel information for the trigger sequence to the second device; and receiving a first response message including the scanning channel information from the second device in response to the first request message.

3. The method of claim 2, wherein
the scanning channel information includes index information indicating at least one of three pre-defined advertising channels.

4. The method of claim 1, wherein
performing the negotiation procedure includes:
transmitting a second request message requesting physical layer information used for transmission/reception of the trigger sequence to the second device; and
receiving a second response message including the physical layer information from the second device in response to the second request message.

5. The method of claim 4, wherein
the physical layer information includes at least one of a transmission PHY parameter indicating a transmission preference physical layer, a reception PHY parameter indicating a reception preference physical layer, or a PHY option parameter designating an option for a physical layer.

6. The method of claim 1, further comprising
generating the trigger codeword using an access address.

7. The method of claim 6, wherein
based on a physical layer used for transmission/reception of the trigger sequence being the coded PHY, a relatively shorter bit is allocated to the trigger codeword than a case that the physical layer is the uncoded PHY.

8. A first device in a method for inter-device reconnection in a wireless communication system using Bluetooth low energy technology, the first device comprising:

a communication unit for wiredly and/or wirelessly transmitting/receiving a signal to/from an external device; and a controller functionally connected with the communication unit, wherein the controller:

enters from a connection state to a suspend state based on that a pre-established connection with a second device is disconnected;

performs a reconnection parameter negotiation procedure with the second device;

transmits a trigger sequence including at least one trigger codeword for requesting a reconnection to the second device via a channel determined based on a result of the negotiation procedure, wherein a length of the trigger sequence is differently allocated based on whether a PHY to which is applied to a transmission of the trigger sequence is a coded PHY or an uncoded PHY;

performs a beacon listening for receives a beacon transmitted by the second device in response to the trigger sequence, wherein transmitting the trigger sequence and performing the beacon listening are performed alternately and repeatedly until the first device receives the beacon from the second device, wherein upon receiving the beacon, the reconnection is formed between the first device and the second device, and wherein a state of the first device is transitioned from the suspend state to the connection state based on the formed reconnection.

* * * * *